United States Patent
Tasooji et al.

(10) Patent No.: US 6,907,416 B2
(45) Date of Patent: Jun. 14, 2005

(54) ADAPTIVE KNOWLEDGE MANAGEMENT SYSTEM FOR VEHICLE TREND MONITORING, HEALTH MANAGEMENT AND PREVENTIVE MAINTENANCE

(75) Inventors: Amaneh Tasooji, Tempe, AZ (US); Karen Z. Haigh, Greenfield, MN (US); Dal Vernon C. Reising, Coon Rapids, MN (US)

(73) Assignee: Honeywell International Inc., Morristown, NJ (US)

( * ) Notice: Subject to any disclaimer, the term of this patent is extended or adjusted under 35 U.S.C. 154(b) by 702 days.

(21) Appl. No.: 09/874,074

(22) Filed: Jun. 4, 2001

(65) Prior Publication Data

US 2002/0184178 A1 Dec. 5, 2002

(51) Int. Cl.[7] ............................................... G06F 15/18
(52) U.S. Cl. .......................................... 706/50; 706/14
(58) Field of Search ........................................... 706/50

(56) References Cited

U.S. PATENT DOCUMENTS

| | | | |
|---|---|---|---|
| 5,208,898 A | * 5/1993 | Funabashi et al. | ............ 706/45 |
| 5,265,832 A | 11/1993 | Wesling et al. | |
| 5,442,553 A | 8/1995 | Parrillo | |
| 5,445,347 A | 8/1995 | Ng | |
| 5,696,884 A | * 12/1997 | Heckerman et al. | .......... 706/61 |
| 5,715,374 A | * 2/1998 | Heckerman et al. | .......... 706/46 |
| 5,720,007 A | * 2/1998 | Hekmatpour | ................ 706/50 |
| 5,798,458 A | 8/1998 | Monroe | |
| 5,806,056 A | * 9/1998 | Hekmatpour | ................ 706/50 |
| 5,884,202 A | 3/1999 | Arjomand | |
| 5,890,079 A | 3/1999 | Levine | |
| 5,931,877 A | 8/1999 | Smith et al. | |
| 5,974,349 A | 10/1999 | Levine | |
| 6,009,356 A | 12/1999 | Monroe | |
| 6,560,589 B1 | * 5/2003 | Stier et al. | ..................... 706/50 |
| 6,591,258 B1 | * 7/2003 | Stier et al. | ..................... 706/50 |
| 6,615,199 B1 | * 9/2003 | Bowman-Amuah | .......... 706/50 |
| 6,633,742 B1 | * 10/2003 | Turner et al. | ............... 434/350 |

OTHER PUBLICATIONS

Using information management to integrate smart vehicle subsystems Silbert, M; Digital Avionics Systems Conference, 1996., 15th AIAA/IEEE , Oct. 27–31, 1996 pp.: 301–305.*

(Continued)

*Primary Examiner*—Michael B. Holmes
(74) *Attorney, Agent, or Firm*—Robert Desmond, Esq.

(57) ABSTRACT

A method and an Adaptive Knowledge Management is provided. The Adaptive Knowledge Management System is used for assisting a user with decision making by providing real-time, on-line automated recommendations for actions in a monitored vehicle troubleshooting, performance trend monitoring, health management and preemptive maintenance domain diagnostics and prognostics. The system creates a Structured Knowledge Repository, constructed from models, historical data, and heuristics for organizing a model domain knowledge. It uses a plurality of Analytical and Machine Learning tools for capturing knowledge from data sources and populating cells of the Structured Knowledge Repository. A Mixed-Initiative Planning module is used for interpreting operation goals for the monitored vehicle and utilizing the Structure Knowledge Repository for developing recommendations for user decision making. A plurality of Mixed-initiative Decision Support tools use the feedback from the Mixed-initiative Planning module and query the Structured Knowledge Repository for incorporating the extracted knowledge and information into outputs dealing with current issues and contingencies.

10 Claims, 2 Drawing Sheets

OTHER PUBLICATIONS

A situation–driven adaptive pilot/vehicle interface Mulgund, S.S.; Zacharias, G.L.; Human Interaction with Complex Systems, 1996. HICS '96. Proceedings., Third Annual Symposium on , Aug. 25–28, 1996 pp.: 193–198.*

Proceedings of 2002 International Conference on Machine Learning and Cybernetics (Cat.No.02EX583) Machine Learning and Cybernetics, 2002. Proceedings. 2002 International Conference on , vol.: 2 , Nov. 4–5, 2002.*

Modeling and design methodology for mechatronic systems Isermann, R.; Mechatronics, IEEE/ASME Transactions on , vol.: 1 , Issue: 1 , Mar. 1996 pp.: 16–28.*

On the design and control of mechatronic systems–a survey Isermann, R.; Industrial Electronics, IEEE Transactions on , vol.: 43 , Issue: 1 , Feb. 1996 pp.: 4–15.*

Proceedings of the 2001 American Control Conference. (Cat. No.01CH37148) American Control Conference, 2001. Proceedings of the 2001 , vol.: 1 , Jun. 25–27, 2001.*

Mechatronic systems for machines and automobiles Isermann, R.; Advanced Intelligent Mechatronics '97., IEEE/ASME International Conference on , Jun. 16–20, 1997 pp.: 105.*

Use of adaptive model–based reasoning for embedded diagnostics and redundancy management for fault tolerant systems Nolan, M.; Giordano, J.P.; AUTOTESTCON '97. 1997 IEEE Autotestcon Proceedings , Sep. 22–25, 1997 pp.: 455–466.*

Mechatronic systems–a challenge for control engineering Isermann, R.; American Control Conference, 1997. Proceedings of the 1997 , vol.: 5 , Jun. 4–6, 1997 pp.: 2617–2632 vol. 5.*

An Examination Of The Application Of Expert Systems In Unmanned Untethered submersibles Blidberg, D.; Westneat, A.; Corell, R.; Oceans , vol.: 15 , Aug. 1983 pp.: 111–114.*

BEAM: technology for autonomous self–analysis Mackey, R.; James, M.; Han Park; Zak, M.; Aerospace Conference, 2001, IEEE Proceedings. , vol.: 6 , Mar. 10–17, 2001 pp.: 2989–3001 vol. 6.*

An optimizing system for troubleshooting Felke, T.; Aerospace and Electronics Conference, 1988. NAECON 1988., Proceedings of the IEEE 1988 National , May 23–27, 1988 pp.: 1232–1236 vol. 4.*

Improving the quality of technical data for developing case based reasoning diagnostic software for aircraft maintenance Heider, R.; Data Engineering, 1997. Proceedings. 13th International Conference on , Apr. 7–11, 1997 pp.: 584.*

Adaptive diagnostics and personalized technical support (ADAPTS) Cooper, D.W.; Veitch, F.P.; Anderson, M.M.; Clifford, M.J., Aerospace Conference, 1999. Proceedings. 1999 IEEE , vol.: 3 , Mar. 6–13, 1999 pp.: 139–149 vol. 3.*

Adaptive tactical navigation denouement Berning, S.L.; Howe, P.G.; Glasson, D.P.; Aerospace and Electronics Conference, 1990. NAECON 1990., Proceedings of the IEEE 1990 National , May 21–25, 1990 pp.: 332–337 vol. 1.*

An investigation of neural networks for F–16 fault diagnosis. I. System description McDuff, R.J.; Simpson, P.K.; Gunning, D.; AUTOTESTCON '89. IEEE Automatic Testing Conference. Conference Record. , Sep. 25–28, 1989 pp.: 351–357.*

Hybrid reasoning for prognostic learning in CBM systems Garga, A.K., McClintic, K.T.; Campbell, R.L.; Chih–Chung Yang; Lebold, M.S.; Hay, T.A.; Byington, C.S.;Aerospace Conference, 2001, IEEE Proceedings. , vol.: 6 , Mar. 10–17, 2001 pp.: 2957–2969.*

Experimental evaluation of the adaptive tactical navigator Glasson, D.P.; Berning, S.L.; Aerospace and Electronics Conference, 1989. NAECON 1989., Proceedings of the IEEE 1989 National , May 22–26, 1989 pp.: 1906–1912 vol. 4.*

* cited by examiner

ADAPTIVE KNOWLEDGE MANAGEMENT SYSTEM FOR VEHICLE TREND MONITORING, HEALTH MANAGEMENT AND PREVENTIVE MAINTENANCE

BACKGROUND OF THE INVENTION

The present invention generally relates to computer-aided knowledge systems and, more particularly, to computer-aided information and knowledge systems for commercial and military vehicles, such as aircraft, tanks, and other ground vehicles.

The air-worthiness of a vast number of aircraft and other vehicles is dependent upon many inter-dependent subsystems. Often, when any one of many critical components fails or requires repair, service is disrupted because the entire aircraft or several major systems must be removed from service. Service disruption results in delays, cancellations and significant cost for airline operators, as well as passenger inconvenience. Traditionally, service disruptions are prevented or reduced by large parts inventories and by premature replacement of systems, subsystems and component parts. These remedies are sub-optimum because inventories consume capital and risk obsolescence, and because premature maintenance and component replacement under-utilizes the assets.

There is an increasing need for automated troubleshooting systems, which has prompted many companies to turn to application software to deploy and manage their troubleshooting applications effectively. Quite commonly, these applications are configured to interface with a tested unit in real time, in order to explore, evaluate and implement a corrective action as soon as possible.

Unfortunately, presently there is no existing computer-aided information and knowledge system that allows users to retrieve the internal information from the unit under test in order to facilitate troubleshooting of the malfunctioning unit, which is also capable of downloading the information and goals and providing recommendation for decision making about the tested unit. Thus, the user is forced to turn to a slow, manual downloading and off-line analysis, which are complex and cumbersome alternatives, to gain access to needed data sources, and makes the decision himself. Often, the alternatives are very costly and time-consuming to implement, require a more sophisticated set of skills, and may consume additional human and machine resources to execute.

Therefore, there is a need for a method and a software system which can reduce the delays, cancellation, and inventories that must be carried to ensure parts availability, in order to better manage the maintenance and repair of aircraft systems, subsystems, and components.

SUMMARY OF THE INVENTION

In one aspect of the present invention, an Adaptive Knowledge Management System for assisting a user with decision making by providing real-time, on-line automated recommendations for actions in a monitored vehicle troubleshooting, performance trend monitoring, health management and preemptive maintenance domain diagnostics and prognostics comprises a Structured Knowledge Repository constructed from engineering and first-principle models, historical data, and heuristics for organizing a model of domain knowledge; a plurality of Analytical and Machine Learning tools capturing knowledge from data sources and populating cells of the Structured Knowledge Repository; a Mixed-Initiative Planning module interpreting operation goals for the monitored vehicle and utilizing the Structure Knowledge Repository for developing recommendations for user decision making; and a plurality of Mixed-initiative Decision Support tools using feedback from the Mixed-Initiative Planning module and querying the Structured Knowledge Repository for incorporating the extracted knowledge and information into outputs dealing with current issues and contingencies.

Another aspect of the present invention is a method implemented in the above-mentioned system embodiment of the present invention.

DETAILED DESCRIPTION OF THE INVENTION

Figure 1:
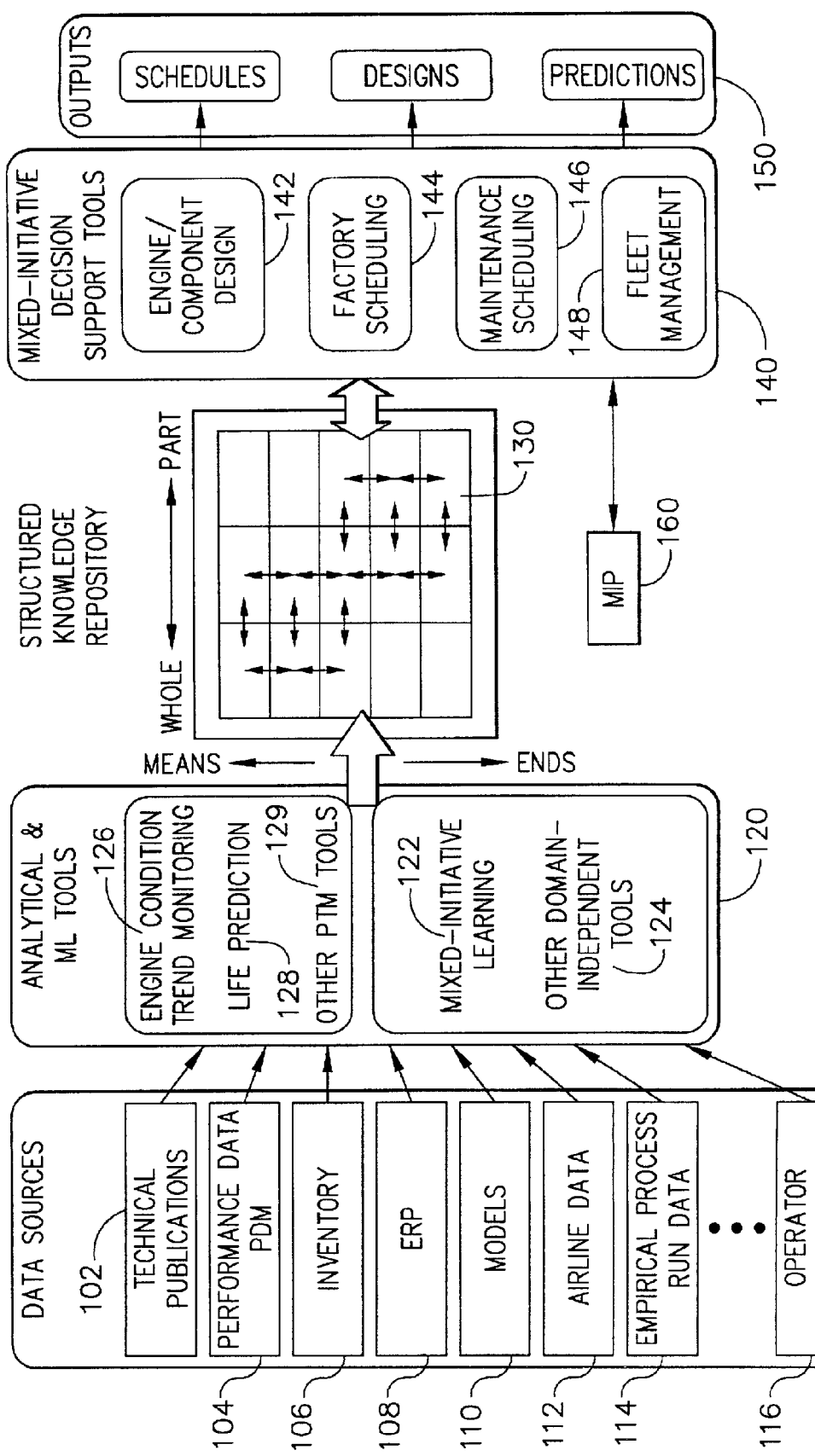
FIG. 1 illustrates a simplified block diagram of an Adaptive Knowledge Management System according to a preferred embodiment of the present invention.

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

The present invention is directed to a method and an Adaptive Knowledge Management System (AKMS) used to exploit all available aircraft information throughout the life cycle, for assisting a user with decision making by providing real-time, on-line automated recommendations, thus enabling the user to explore, evaluate, correct and create actions in performance trend monitoring, health management and preemptive maintenance domains. The real-time nature of the present invention enables diagnosis of needed repairs while an aircraft is in service, thereby assisting in reliability forecasting and predictions for enabling better planning of parts and maintenance actions. Aggregated data over the life of the aircraft and fleet also serve to provide the basis for drawing conclusions about changes to the equipment/component designed based on use conditions and failure modes.

The technique utilized in the preferred embodiments of the present invention is automated and implemented in aircraft controllers, for real-time corrective action. The Adaptive Knowledge Management System utilizes information and knowledge integration technology, along with the Predictive Trend Monitoring System (PTMS), which retrieves the internal information from the tested vehicle unit in order to identify malfunctioning units and their components, for automated troubleshooting, component trend monitoring, diagnostics, and prognostics.

The information and knowledge needed for the AKMS is collected from various sources, which include first-principles models, historical data, and heuristics, and these data are exploited to construct a structured and operational knowledge base, named a Structured Knowledge Repository. First-principles models mathematically represented aircraft system behavior, and include life models, thermodynamics models, and kinetics models, rate equations, etc. Historical Data include data for engine condition trend monitoring, operating parameters, product quality and reliability data, test data, statistical/empirical models developed from historical data, such as fleet averages, etc. Heuristics include experiential and rule-based knowledge.

Structured Knowledge Repository is created by utilizing a knowledge builder module of the present invention, which uses numerous analytical and machine learning techniques, including symbolic, empirical, and hybrid approaches. Structured Knowledge Repository organizes the domain knowledge, used to provide recommendation for decision making. This module uses a cognitive work analysis framework for knowledge organization. A Decision Maker module of the present invention interprets the operation goals for the monitored vehicle system, such as life, performance, temperature, pressure, environment, etc. It utilizes the Structure Knowledge Repository and any other user input information to develop a recommendation, and presents it to the user to act on.

The Decision Maker module analyzes and transforms the knowledge to find an optimal action for a computer processor embedded in the monitored vehicle, which can be used for batch processing or can be implemented in aircraft controllers, for interactive and real-time processing. The Decision Maker module uses a Mixed-initiative Planning module that allows a human user to interact with and guide an automated planner module, implemented in the monitored vehicle computer processor. The present invention may utilize many applicable electronic and information technology products, as well the Internet World Wide Web, for information transfer and other communication purposes. Knowledge Builder and Decision Maker are preferably coded using an object-oriented programming language.

The Predictive Trend Monitoring System provides the user with real-time data analysis, filtering and trend monitoring, as a support for diagnostics, maintenance, life prediction and other vehicle needs, as well as other in-flight supports such as emergency medical need. This is accomplished through the application of real-time aircraft operating environment information, combined with troubleshooting, trend monitoring, diagnostics, and prognostics tools. This module uses sensors which are attached to aircraft components to collect relevant information, such as operating environment, pressure, temperature, vibration, load, chemistry, organic gases, biological environment, etc. It has communication modules provided to transmit the data from the sensors to a computer processor. It also has communication modules used for transmitting and receiving the signals, which may use wire, fiber optic cabling, or more preferably, wireless transmission, with spread spectrum wireless technology in compliance with FCC and FAA requirements.

The PTMS computer processor may be dedicated or alternatively may utilize the vehicle central on-board computing systems, such as Flight Data Analysis & Management System, FDAMS, AIMS, DMU, CMU, CMC, AMOSS, E-MOSS, etc. It performs on-board data analysis using analysis, trend monitoring, diagnostics, and prognostics tools and algorithms. The output of the computer processor is a status indication regarding health of the system and its components.

In addition, PTMS also provides means for transmitting critical information to appropriate downstream processors that schedule maintenance or parts dispatch. Other recipients of the information could be the aircraft crew, via on-board data transmission, or ground stations, via air-to-ground transmission, such as broadband, satellite, RF, ACARS, wireless, etc. The information is then used on-board and in ground stations for actions required in providing Just-in-Time product availability and solutions, such as technical, medical, entertainment, trade, business, etc. Since air-to-ground data transmittal is accomplished in real-time, with less than two minutes of delay, this capability can also be used for emergency and medical needs, such as for transmitting the patient's vital signs, to appropriate stations and individuals.

A simplified block diagram of a system preferred embodiment of the present invention is presented in FIG. 1. According to FIG. 1, the Adaptive Knowledge Management System uses disparate data sources 100, parses the data and provides them to Analysis and Machine Learning tools 120, which produce the Structured Knowledge Repository 130. The information and knowledge from the Structured Knowledge Repository 130 enter Mixed-Initiative Decision Support tools 140, which produce output products 150 incorporating the knowledge and information from the Structured Knowledge Repository 130.

Adaptive Knowledge Management System analyzes data from disparate data sources 100, such as technical publications 102 with system documentation, operating procedures, and manuals which have information about actual physical components and equipment of the vehicle, such as each turbine blade details; performance data 104; inventory data 106; Enterprise Resource Planning 108; models 110; airline data 112; empirical process run data 114; and heuristics from management and operations personnel 116.

Adaptive Knowledge Management system integrates data from these disparate data sources 110 of information, using a knowledge builder of the present invention with Analytical and Machine Learning tools 120 to populate the structured knowledge repository 130 from potential sources, such as necessary for the task goal. Analytical and Machine Learning tools 120, use a machine learning technique appropriate for the data source to extract information. The technique may be symbolic, empirical, or hybrid, domain-dependent or domain-independent, and run in supervised or unsupervised modes. Some of these Analytical and Machine Learning tools 120 are a Mixed-Initiative Learning module 122 and other domain-independent tools 124 such as model-based learning and explanation-based learning. In this embodiment, domain-dependent analytical tools 129 include Engine Condition Trend Monitoring (ECTM) 126, life prediction 128 and other PTM tools. A specific analytical or machine learning technique uses data from the disparate data sources 100 and it populates the appropriate cells 132 of the structured knowledge repository 130.

Structured Knowledge Repository 130 is a knowledge base created by knowledge capturing techniques and having a hierarchy of abstract data and functions. It supports various levels of abstraction when reasoning about a system or domain. It is used as a semantic 'scaffolding' that organizes domain information into knowledge. It represents model domain knowledge, using the Abstraction-Decomposition Space framework, in Abstraction-Decomposition Space (ADS) format for the Structured Knowledge Repository 130 construction. It uses constraints, capabilities, and relationships, such as functional organization represented in FIG. 1 as means-ends rows, and physical organization represented in FIG. 1 in whole-part columns. The Means-Ends rows and Whole-Part columns, and thus cells 132, are organized, so that the high-level, wholistic (abstract) information is located in the top left corner, and is used by systems engineers and management, and the lower-level, concrete (less abstract) information is located in the bottom right corner, and is used by technicians.

Figure 2:
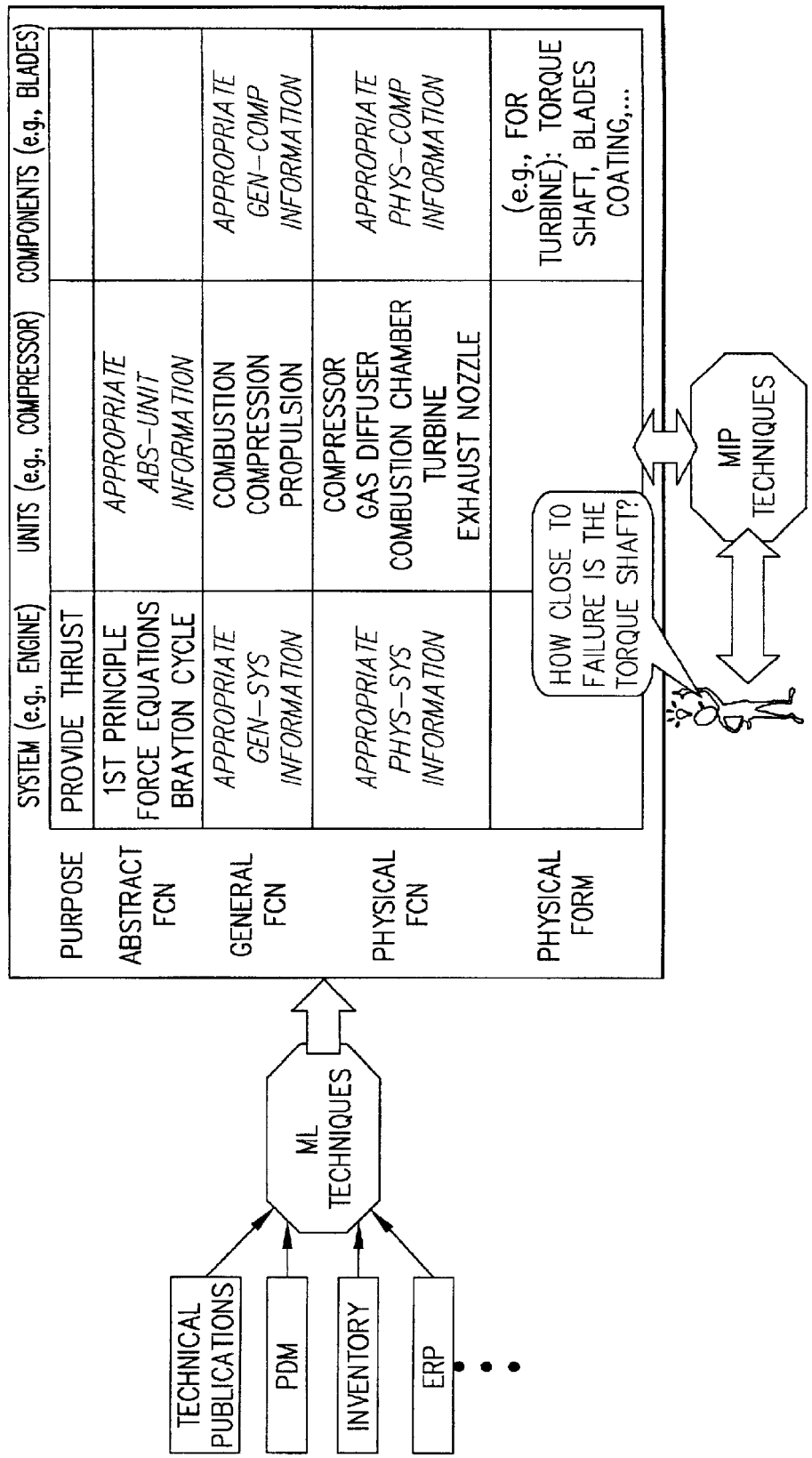
FIG. 2 illustrates the Structured Knowledge Repository in more detail, and shows some exemplary data placed in the cells of the Structured Knowledge Repository, according to preferred embodiments of the present invention.

FIG. 2 illustrates the structure of the cells 132 of the Structured Knowledge Repository 130 in more detail, and shows some exemplary data placed in the cells 132 of the Structured Knowledge Repository 130. The means-ends rows have purpose (goals) at the highest abstraction level, then abstract function that typically contains first-principles equations, general function with information about the generalized engineering, physical function with information about specific engineered subsystems and components, and physical form with module physical characteristics. The whole-part columns are systems at the highest aggregation level, then units (modules), and components.

The knowledge from the cells 132 of the Structured Knowledge Repository 130 is used in such a way that when asking why a 'nugget' is present, the up relational links provide the answer to why, by defining a parent, and when asking how a 'nugget' is accomplished, the down links provide the answer to how, by defining a method.

Mixed-initiative Decision Support tools 140 have some decision making tools that meaningfully query the Structured Knowledge Repository 130 to support human users with planning and other decision-making problems, including for example to address current design needs 142, to adjust factory production set points 144, improve maintenance schedules 146 and fleet management 148, and to provide airline passenger scheduling. The tools incorporate a Mixed-Initiative Planning module 160 that identifies tradeoffs between competitive goals and limiting resources, develops a prioritization scheme appropriate for the domain, and makes decisions based on this information.

The Decision Support Tools 140 can also be used to learn how to improve system behavior, and update system models and knowledge bases. For this purpose, they use a feedback from a Mixed-initiative Planning module 160 to create predictions of behavior under specific conditions, through correlation and pattern recognition. This updated information can then be used by the Decision Support Tools 140 in a meaningful way, such as to improve scheduling and run-time control.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An Adaptive Knowledge Management System for assisting a user with decision making by providing real-time, on-line automated recommendations for actions in a monitored vehicle troubleshooting, performance trend monitoring, health management and preemptive maintenance domain diagnostics and prognostics, comprising:

a Structured Knowledge Repository constructed from models, historical data, and heuristics for organizing a model domain knowledge, wherein the Structured Knowledge Repository represents the model domain knowledge in Abstraction-Decomposition Space format, and using constraints, capabilities, relationships as prioritized means-ends rows, and physical organization as prioritized whole-part columns;

a plurality of Analytical and Machine Learning tools capturing knowledge from data sources and populating cells of the Structured Knowledge Repository;

a Mixed-Initiative Planning module interpreting operation goals for the monitored vehicle and utilizing the Structure Knowledge Repository for developing recommendations for user decision making; and a plurality of Mixed-initiative Decision Support tools using a feedback from the Mixed-Initiative Planning module and querying the Structured Knowledge Repository for incorporating the extracted knowledge and information into outputs dealing with current issues and contingencies.

2. The system according to claim 1, wherein the Analytical and Machine Learning tools use a machine learning technique appropriate for the data source to extract information, with the technique being symbolic, empirical, or hybrid, domain-dependent or domain-independent, and run in supervised or unsupervised modes.

3. The system according to claim 1, wherein the means-ends rows have goals at the highest abstraction level, then abstract functions that typically contains first-principles equations, general functions with information about the generalized engineering, physical functions with information about the specific engineered subsystems and components, and physical forms with module physical characteristics, and the whole-part columns having system at the highest aggregation level, then units, and components.

4. The system according to claim 1, wherein the Mixed-Initiative Planning module further includes creating predictions of behavior models through correlation and pattern recognition, and developing a prioritization scheme using artificial intelligence rules prioritization techniques.

5. An Adaptive Knowledge Management System for assisting a user with decision making by providing real-time, on-line automated recommendations for actions in a monitored vehicle troubleshooting performance trend monitoring health management and preemptive maintenance domain diagnostics and prognostics, comprising:

a Structured Knowledge Repository constructed from models, historical data, and heuristics for organizing a model domain knowledge;

a plurality of Analytical and Machine Learning tools capturing knowledge from data sources and populating cell of the Structured Knowledge Repository;

a Mixed-Initiative Planning module interpreting operation goals for the monitored vehicle and utilizing the Structure Knowledge Repository, for developing recommendations for user decision making; and a plurality of Mixed-initiative Decision Support tools using a feedback from the Mixed-Initiative Planning module and querying the Structured Knowledge Repository for incorporating the extracted knowledge and information into outputs dealing with current issues and contingencies, wherein the Mixed-Initiative Decision Support tools create the outputs usable for vehicle design, adjust factory production set points, improve maintenance schedules, improve fleet management, and make predictions.

6. A method usable in an Adaptive Knowledge Management System for assisting a user with decision making by providing real-time, on-line automated recommendations for actions in a monitored vehicle troubleshooting performance trend monitoring, health management and preemptive maintenance domain diagnostics and prognostics, comprising the following steps;

(a) constructing a Structured Knowledge Repository from model, historical data, and heuristics for organizing a model domain knowledge, wherein the Structured Knowledge Repository represents the model domain knowledge in Abstraction-Decomposition Space format, and uses constraints, capabilities, relationships as structured means-ends rows, and physical organization as structured whole-part columns;

(b) using a plurality of Analytical and Machine Learning tools for capturing knowledge from data sources and populating cells of the Structured Knowledge Repository;

(c) using Mixed-Initiative Planning module for interpreting operation goals for the monitored vehicle and utilizing the Structure Knowledge Repository for developing recommendations for user decision making; and (d) using a plurality of Mixed-initiative Decision Support tools for utilizing a feedback from the Mixed-Initiative Planning module and querying the Structured Knowledge Repository, for incorporating the extracted knowledge and information into outputs dealing with current issues and contingencies.

7. The method according to claim 6, wherein the step of using the Analytical and Machine Learning tools includes using a machine learning technique appropriate for the data source to extract information, with the technique being symbolic, empirical, or hybrid, domain dependent or domain independent, and run in supervised or unsupervised modes.

8. The method according to claim 6, wherein the means-ends rows have goals at the highest abstraction level, then abstract functions with equations, general functions with information about the general engineering, physical functions with information about the specific engineered subsystems and components, and physical forms with module physical characteristics, and the whole-part columns having system at the highest aggregation level, then units, and components.

9. A method usable in an Adaptive Knowledge Management System for assisting a user with decision making by providing real-time, on-line automated recommendations for actions in a monitored vehicle troubleshooting, performance trend monitoring, health management and preemptive maintenance domain diagnostics and prognostics, comprising the following steps:

(a) constructing a Structured Knowledge Repository from models, historical data, and heuristics for organizing a model domain knowledge;

(b) using a plurality of Analytical and Machine Learning tools for capturing knowledge from data sources and populating cells of the Structured Knowledge Repository;

(c) using a Mixed-Initiative Planning module for interpreting operation goals for the monitored vehicle and utilizing the Structure Knowledge Repository for developing recommendations for user decision making, wherein the step of using the Mixed-Initiative Planning module further includes creating predictions of behavior models through correlation and pattern recognition, and developing a prioritization scheme to tradeoff competing goals and resource limitations; and (d) using a plurality of Mixed-initiative Decision Support tools for utilizing a feedback from the Mixed-Initiative Planning module and querying the Structured Knowledge Repository, for incorporating the extracted knowledge and information into outputs dealing with current issues and contingencies.

10. A method usable in an Adaptive Knowledge Management System for assisting a user with decision making by providing real-time, on-line automated recommendations for actions in a monitored vehicle troubleshooting, performance trend monitoring, health management and preemptive maintenance domain diagnostics and prognostics, comprising the following steps:

(a) constructing a Structured Knowledge Repository from models, historical data, and heuristics for organizing a model domain knowledge;

(b) using a plurality of Analytical and Machine Learning tools for capturing knowledge from data sources and populating cells of the Structured Knowledge Repository;

(c) using a Mixed-Initiative Planning module for interpreting operation goals for the monitored vehicle and utilizing the Structure Knowledge Repository for developing recommendations for user decision making; and (d) using a plurality of Mixed-initiative Decision Support tools for utilizing a feedback from the Mixed-Initiative Planning module and querying the Structured Knowledge Repository, for incorporating the extracted knowledge and information into outputs dealing with current issues and contingencies, wherein the step of using the Mixed-Initiative Decision Support tools includes creating the outputs usable for vehicle design, adjusting factory production set points, improving maintenance schedules, improving fleet management, and making predictions.

* * * * *

UNITED STATES PATENT AND TRADEMARK OFFICE
CERTIFICATE OF CORRECTION

| | |
|---|---|
| PATENT NO. | : 6,907,416 B2 |
| APPLICATION NO. | : 09/874074 |
| DATED | : June 14, 2005 |
| INVENTOR(S) | : Amaneh Tasooji et al. |

It is certified that error appears in the above-identified patent and that said Letters Patent is hereby corrected as shown below:

Column 6, line 43, "cell" should be changed to --cells--;
Column 6, line 66, "model" should be changed to --models--.

Signed and Sealed this

Third Day of April, 2007

JON W. DUDAS
*Director of the United States Patent and Trademark Office*